United States Patent
Mate et al.

(10) Patent No.: US 6,970,438 B2
(45) Date of Patent: Nov. 29, 2005

(54) METHOD AND DEVICE FOR DOWNLINK PACKET SWITCHING

(75) Inventors: Amit Mate, Helsinki (FI); Mika Rinne, Espoo (FI)

(73) Assignee: Nokia Mobile Phones Ltd., Espoo (FI)

( * ) Notice: Subject to any disclaimer, the term of this patent is extended or adjusted under 35 U.S.C. 154(b) by 818 days.

(21) Appl. No.: 09/788,275

(22) Filed: Feb. 16, 2001

(65) Prior Publication Data

US 2002/0141331 A1 Oct. 3, 2002

(51) Int. Cl.[7] .................................................. H04Q 7/00
(52) U.S. Cl. ........................ 370/329; 370/335; 370/342; 370/441; 370/479
(58) Field of Search ................................ 370/206, 208, 370/277, 281, 315, 319, 328, 329, 335, 342, 343, 437, 441, 479

(56) References Cited

U.S. PATENT DOCUMENTS

| | | | |
|---|---|---|---|
| 5,903,552 A | 5/1999 | Raith | 370/337 |
| 6,031,827 A | 2/2000 | Rikkinen et al. | 370/330 |
| 6,144,645 A | 11/2000 | Struhsaker et al. | 370/280 |
| 6,212,176 B1 | 4/2001 | Andersson et al. | 370/347 |
| 6,320,843 B1 | 11/2001 | Rydbeck et al. | 370/207 |
| 6,661,777 B1 * | 12/2003 | Blanc et al. | 370/252 |
| 6,747,963 B1 * | 6/2004 | Park et al. | 370/335 |
| 2001/0053140 A1 * | 12/2001 | Choi et al. | 370/335 |
| 2002/0025815 A1 * | 2/2002 | Rune et al. | 455/436 |
| 2002/0094833 A1 * | 7/2002 | Lieshout et al. | 455/522 |

OTHER PUBLICATIONS

3G TS 25.101 V3.1.0 (Dec. 1999) 3rd Generation Partnership Project (3GPP); Technical Specification Group (TSG) RAN WG4, UE Radio Transmission and Reception (FDD).
3G TS 25.211 V3.4.0 (Sep. 2000) 3rd Generation Partnership Project (3GPP); Technical Specification Group Radio Access Network; Physical channels and mapping of transport channels onto physical channels (FDD) (Release 1999).

* cited by examiner

*Primary Examiner*—Chi Pham
*Assistant Examiner*—Ly Vu
(74) *Attorney, Agent, or Firm*—Ware, Fressola, Van Der Sluys & Adolphson LLP

(57) ABSTRACT

A method of downlink packet switching for use in a mobile telecommunications network having a plurality of base stations capable of communicating in corresponding uplink and downlink with a plurality of mobile terminals operating in a frequency division duplex (FDD) mode, wherein a downlink shared channel (DSCH) is used to carry user data and control information for the mobile terminals in a coverage area, the method comprising the steps of providing a common packet channel (CPCH) to serve as a reverse link transport of the downlink shared channel (DSCH) in a deterministic way; and providing for carrying a downlink dedicated physical control channel (DL-DPCCH) to provide physical transport format (TFCI) for the downlink shared channel and physical control for the uplink CPCH.

52 Claims, 11 Drawing Sheets

METHOD AND DEVICE FOR DOWNLINK PACKET SWITCHING

FIELD OF THE INVENTION

The present invention generally relates to a mobile telephone network and, more specifically, to a frequency division multiplex (FDD) mode of a mobile terminal of the mobile telephone network to provide communication links between the mobile terminal and one or more base stations.

BACKGROUND OF THE INVENTION

Universal Terrestrial Radio Access Network (UTRAN) is a conceptual term identifying a part of a radio communication network, wherein a plurality of mobile terminals communicate with each other or with a terminal in a PSTN or in a packet network (e.g. Internet) through one or more base stations. In particular, UTRAN identifies part of the network, which consists of radio network controllers (RNCs) and Node Bs between interconnection (Iu) and the radio interface (Uu). The interconnection Iu is an interface between an RNC and a core network, and the radio interface Uu is between UTRAN and the user equipment. This forms the basic architecture for the third generation mobile phone system UMTS (Universal Mobile Telecommunication System). The architecture of UMTS will include UTRA for radio access.

One of the modes of UTRAN for the user equipment (UE) is the FDD (Frequency-Division Duplex) mode, as distinguished from the time-division duplex (TDD) mode. UE radio transmission and reception (FDD) is described in the Technical Specification (TS) 25.101 v 3.1.0 (1999-12) of the Third Generation Partnership Project (3GPP) and documents referenced therein.

It is known that in the third-generation (3G) mobile telecommunications system, wideband code division multiple access (WCDMA) has emerged as the mainstream air interface solution. In a WCDMA system, information bits are spread over a wide bandwidth by multiplying data with quasi-random bits (chips) derived from CDMA spreading codes, i.e. the channelization codes. In Universal Terrestrial Radio Access (UTRA), the data generated at higher layers is carried over the air on transport channels, which are mapped onto the physical code channels. Different types of transport channels exist, namely common channels, dedicated channels and shared channels. In the cell_DCH state, the dedicated channel (DCH) is used to carry all the signaling messages and all the information from higher protocol layers, including data for the service as well as control information. There are currently six different common transport channels: Broadcast Channel (BCH), Forward Access Channel (FACH), Paging Channel (PCH), Random Access Channel (RACH), Uplink Common Packet Channel (CPCH) and Downlink Shared Channel (DSCH). The RACH channel is intended for signaling messages from the terminal, such as a request to set up a connection. The CPCH is an extension to the RACH that is intended to carry packet data in the uplink direction. In the cell_FACH state, the counterpart of the uplink RACH and CPCH is FACH in the downlink. The FACH is used to carry control information and signaling messages to the mobile terminals known to locate in a given cell or in a given paging area. The DSCH is used to carry user data. The information carried on a DSCH is typically dedicated to a user, but the DSCH could be used to carry data that is shared by several users e.g. multicasting. The DSCH is always associated with an uplink and downlink DCH, noted as associated DCH (aDCH). The aDCH carries the physical control information between the terminal and the base station.

It is well known that the Protocol Data Units (PDUs) from higher layers are carried over the air interface by the transport channels. Different transport channels are multiplexed onto the physical codes. Physical channels and transport channels are specified in 3GPP TS 21.211 V3.4.0 (2000-9). In particular, the DSCH transport channel is mapped onto the Physical Downlink Shared Channel (pDSCH); the CPCH is mapped to the Physical Common Packet Channel (pCPCH); and the DCH is mapped to the dedicated physical channel DPCH, which is a code multiplex of the Dedicated Physical Data Channel (DPDCH) and the Dedicated Physical Control Channel (DPCCH) in the uplink, and a time multiplex of the Dedicated Physical Data Channel (DPDCH) and Dedicated Physical Control Channel (DPCCH) in the downlink.

In the physical transport, scrambling codes are used in addition to the channelization codes, so that signals from different sources can be separated from each other without changing the signal bandwidth and to generate lower cross correlation products. Transmission from a single source can be separated by the orthogonal channelization codes (spreading codes). The codes are selected from a code tree (Orthogonal Variable Spreading Factor codes) to satisfy the orthogonality condition. Channelization codes provide the spectrum spreading sequences. Orthogonal codes are selected for different transport bitstreams so that despreading a received code can give high signal-energy to noise-energy ratios. The scrambling codes separate signals from different terminals in the uplink. The scrambling codes separate signals from different cells or cell sectors in the downlink.

The DSCH transport channel is capable of multiplexing a large number of bearers either in time division manner, in code division manner or both. The time division is done so that the transmission is divided to scheduling periods, and for each period a scheduler decides which bearer, or which radio link control (RLC) buffer, to transmit. The code division is carried out so that a DSCH code sub-tree is further divided to multiple pDSCH code sub-trees. Allocation of each pDSCH is decided by the corresponding scheduler. An example of pDSCH code sub-tree is shown in FIG. 1. When a code-tree node is reserved for the DSCH, it may be entirely applied to transmit on one physical code for one terminal during a scheduling period. Alternatively, it may be code-divided to transmit for several terminals each on a separate physical code pDSCH during the same scheduling period, thus several physical codes are allocated below the DSCH code-tree node at the same time. For example, the code-tree node 110 at SF=4 is reserved for the DSCH to transmit on one physical code for one terminal. However, all the nodes 111–116 in the branches beneath the code-tree node 110 in this code sub-tree can be used to allocate different physical codes so that several terminals can receive different physical codes during one scheduling period of time. The physical codes allocated in the nodes 111 and 112 are orthogonal as the nodes 113–116 are orthogonal codes. As mentioned earlier, the DSCH is always associated with an aDCH. This means that every terminal, which uses the DSCH and is subject to DSCH scheduling always sets up the aDCH in the uplink and in the downlink. The dedicated physical control (DPCCH) is always on the DCH. However, the data PDUs (protocol data units) can be on the DCH or on the DSCH depending on the scheduling and the MAC (medium access control) switching between the DCH and DSCH. The DCH nodes are allocated on the code-tree in the part of the tree that is outside of the DSCH reservation. As shown in FIG. 1, the aDCH can be allocated on the many nodes in many branches outside of the branch under code 110. For example, nodes 122, 155, 153 and 154 can be used to allocate the physical codes for the aDCHs of different terminals. However, nodes 120, 151 and 152 are blocked because these nodes would not preserve orthogonality to the already allocated (122, 155, 153, 154) codes.

The maximum bitrate that will be available on the DSCH is high, because a low spreading factor node in the code tree can be reserved for it. This is because reserving a node for DSCH allows multiple terminals to use the same code. If this same node would be reserved for a DCH, all other terminals would be blocked. Thus DSCH uses the code tree more efficiently than a DCH. Hence, the DSCH is capable of providing high throughput and lower packet delays for a large number of bursty bearers having simultaneous sessions.

For web-type traffic and TCP sessions, packet generation is typically very bursty with short, high peak bitrate active periods and long in-activity periods. For web sources, there are short bursts of high volume data or high bitrate data, and long periods of no activity, e.g. during the webpage "reading" time. For traffic like this, the dedicated transport channel resources are not used effectively. If this kind of traffic is carried on a DCH, it requires setting up and releasing codes frequently. The penalty of doing this is the delay caused by DCH setup signaling and synchronization. If, on the contrary, the code release time is long, there will be no delays, but the code allocation reserves code capacity from the downlink code-tree. In the downlink code-tree, this can cause fairly low spreading factors to be kept allocated, if the expected bitrate is high. This implies increased blocking probability for the other co-existing bearers.

The DSCH gives a clear benefit as to the code resource allocation, as it occupies only a single node in the code-tree per pDSCH. Allocation of this code is efficient, as it will be used for the bearer having heaviest need for data transport at a given scheduling period of time. Between sequential allocation periods, different bearers can be switched and transmitted on the DSCH without any delays. The physical layer TFCI (Transport Format Combination Indicator) signaling is present on the aDCH and it indicates that the transport of the PDUs is actually on the DSCH. TFCI is transmitted in the dedicated physical control channel to inform the receiver which transport channels are active for the current frame and the coding and bitrate mapping in each transmission time interval. The current solution, for switching bearers to the DSCH requires that for every UE, the aDCH is set up, as shown in FIG. 2. This can carry DPCCH for pilot symbols, power control commands and for the TFCI information. It may also carry the DPDCH for the periods of time when the DSCH is not allocated for this particular UE. As shown in FIG. 2, the UE in the cell__FACH state has to receive the aDCH setup message on the FACH, and the UE (and the corresponding network entity) can change from the cell__FACH state to the cell__DCH state during the setup procedure. The settings for the associated DCH may be too demanding for some traffic sources from the cell code-tree resource point of view. Similar problems exist also when trying to allocate any DCH for a high-bitrate bearer. If the release timer for it is long, it unnecessarily consumes code-tree space, and if the spreading factor is low, it badly blocks other bearers. On the other hand, if the release timer is short, the code will be released frequently and every activity period will require setting up the DCH again before data transmission can start. Again, this causes the DCH setup delay. The same applies for the DSCH, as setting up the aDCHs is necessary before switching to the DSCH is possible. The benefit of the DSCH is still that the aDCH does not need to reserve low spreading factor nodes as high bitrates can be transmitted on the DSCH and the nominal bitrates on the DCH. During the packet active period, or whenever the DCH is up, the UE (and the corresponding network entity) changes from the cell__FACH state to the cell__DCH state, and during the "reading" time, or whenever all codes for a UE are released, the UE (and the corresponding network entity) changes back to the cell__FACH state. In a bursty traffic load, switching between the cell__FACH and cell__DCH states is very frequent, thereby causing a delay in packet data transmission. If the aDCH is not released, the UE (and the corresponding network entity) will remain in the cell__DCH state.

In the downlink packet switching, as described herein aDCH serves as a reverse link transport channel for the DSCH as shown in FIG. 2. Diagrammatically, the connection procedure can be represented by FIG. 3.

In order to improve the bursty traffic situation, an earlier solution, which is referred to as the pointer method, is used. In the pointer method, there is a downlink pointer channel of the lowest spreading factor 512, which acts as an aDCH for the DSCH. The pointer channel will point to another channel from a pool of shared control channels of SF 256 before the DSCH transmission begins. This shared control channel is capable of carrying all the signaling necessary for the UE to receive and decode the DSCH during an allocation period. Because the control channels are shared and the aDCH uses the minimum possible spreading factor of 512, the solution is more efficient in code-tree utilization as the traditional aDCH-DSCH case. The pointer method is feasible but still has the delays including setting up the aDCH. Now, as the aDCH uses the highest SF, it need not be released and reallocated frequently but can be kept allocated for long periods of time. One disadvantage is that in this solution the UE has to be capable of receiving, reading and decoding a large number of code channels at the same time. Thus, efficient sleep modes are needed at every possible frame instant to save power consumption of the UE.

It is advantageous and desirable to provide a method and device for fast downlink packet switching even without the strict requirement of setting up the aDCHs.

SUMMARY OF THE INVENTION

It is a primary object of the present invention to achieve DSCH transmission without setting up the ADCHs to overcome the delays caused by the aDCH setup procedure. This object can be achieved by the effective use of a downlink code tree.

The above-mentioned object can be achieved by jointly using CPCH and DSCH to eliminate the frequent switching between the cell__FACH and the cell__DCH states that would otherwise happen for bursty traffic. In the pointer method above, this switching will not happen and the UE (and corresponding network entity) will remain in the cell__DCH state. The method, according to the present invention, allows the UE to remain in the cell__FACH state for both the packet active period and for the inactive "reading" period.

Thus, according to the first aspect of the present invention, a method of improving downlink packet switching for use in a mobile telecommunications network having a plurality of base stations capable of communicating in corresponding uplink and downlink with a plurality of mobile terminals operating a frequency division duplex (FDD) mode, wherein a downlink shared channel (DSCH) is used to carry user data to the mobile terminals, and wherein the mobile terminals are capable of operating in a forward access channel (cell_FACH) state and a dedicated channel (cell_DCH) state and wherein the mobile terminals are also capable of state-switching between the cell_FACH state and the cell_DCH state for setting up an associated dedicated channel (aDCH) for carrying physical control information between the mobile terminals and the base stations in DSCH scheduling for downlink packet switching. The method comprises the steps of:

selecting, by a communicating base station, a mobile terminal among the plurality of mobile terminals for transmission of a defined down link shared channel (DSCH); and providing a message in a forward access channel (FACH) to the selected mobile mobile indicative of an operation mode using a further transportation channel different from the aDCH for carrying the physical control information between the selected mobile terminal and the communicating base station for avoiding the state-switching during the downlink packet switching.

Preferably, the further transportation channel is a common packet channel (CPCH), which is used as a reverse link transport of the defined physical downlink share channel (DSCH). This specified CPCH can be announced to the mobile stations in a system information block (SIB) or, alternatively, as an element presented in the radio resource control (RRC) message.

Preferably, the message is carried in a downlink dedicated physical channel (DL-DPCCH) for the specified CPCH for announcing the CPCH.

Preferably the message in the FACH is provided when a traffic load associated with the cell_FACH state is in a temporal peak-load condition in order to reduce the traffic load.

It is possible to provide the message when the traffic load associated with the cell_FACH state is smaller than a predetermined value and the traffic load is directed to the defined DSCH.

According to the second aspect of the present invention, a mobile telecommunications network having a plurality of base stations capable of communicating in corresponding uplink and downlink with a plurality of mobile terminals operating a frequency division duplex (FDD) mode, wherein a downlink shared channel (DSCH) is used to carry user data to the mobile terminals, and wherein the mobile terminals are capable of operating in a forward access channel (cell_FACH) state and a dedicated channel (cell_DCH) state and wherein the mobile terminals are also capable of state-switching between the cell_FACH state and the cell_DCH state for setting up an associated dedicated channel (aDCH) for carrying physical control information between the mobile terminals and the base stations in DSCH scheduling for downlink packet switching. The network comprise:

means, located in a communicating base station, for selecting a mobile terminal among the plurality of mobile terminals for transmission of a defined down link shared channel (DSCH); and means for providing a message in a forward access channel (FACH) to the selected mobile mobile indicative of an operation mode using a common packet channel (CPCH) for carrying the physical control information between the selected mobile terminal and the communicating base station for avoiding the state-switching during the downlink packet switching.

According to the third aspect of the present invention, a mobile apparatus for use in a mobile telecommunications network having a plurality of base stations capable of communicating in corresponding uplink and downlink with the mobile apparatus and a plurality of further mobile apparatus operating a frequency division duplex (FDD) mode, wherein a downlink shared channel (DSCH) is used to carry user data to the mobile apparatus, and wherein the mobile apparatus is capable of operating in a forward access channel (cell_FACH) state and a dedicated channel (cell_DCH) state, and the mobile apparatus is also capable of state-switching between the cell_FACH state and the cell_DCH state for setting up an associated dedicated channel (aDCH) for carrying physical control information between the mobile apparatus and the base stations in DSCH scheduling for downlink packet switching. The mobile apparatus comprises means for receiving a message conveyed in a forward access channel (FACH) indicative of an operation mode using a common packet channel (CPCH) for carrying the physical control information between the the mobile apparatus and a communicating base station for avoiding the state-switching during the downlink packet switching, when the mobile apparatus is selected by the communicating base station for transmission of a defined down link shared channel (DSCH).

According to the fourth aspect of the present invention, a network apparatus to be used in a mobile telecommunications network having a plurality of base stations capable of communicating in corresponding uplink and downlink with a plurality of mobile terminals operating a frequency division duplex (FDD) mode, wherein a downlink shared channel (DSCH) is used to carry user data to the mobile terminals, and wherein the mobile terminals are capable of operating in a forward access channel (cell_FACH) state and a dedicated channel (cell_DCH) state and wherein the mobile terminals are also capable of state-switching between the cell_FACH state and the cell_DCH state for setting up an associated dedicated channel (aDCH) for carrying physical control information between the mobile terminals and the base stations in DSCH scheduling for downlink packet switching. The network apparatus comprises:

means for selecting a mobile terminal among the plurality of mobile terminals for transmission of a defined down link shared channel (DSCH); and means for providing a message in a forward access channel (FACH) to the selected mobile mobile indicative of an operation mode using a specified common packet channel (CPCH) for carrying the physical control information between the selected mobile terminal and a communicating base station for avoiding the state-switching during the downlink packet switching.

The present invention will become apparent upon reading the description taken in conjunction of FIGS. 4–10.

DETAILED DESCRIPTION

Figure 4:
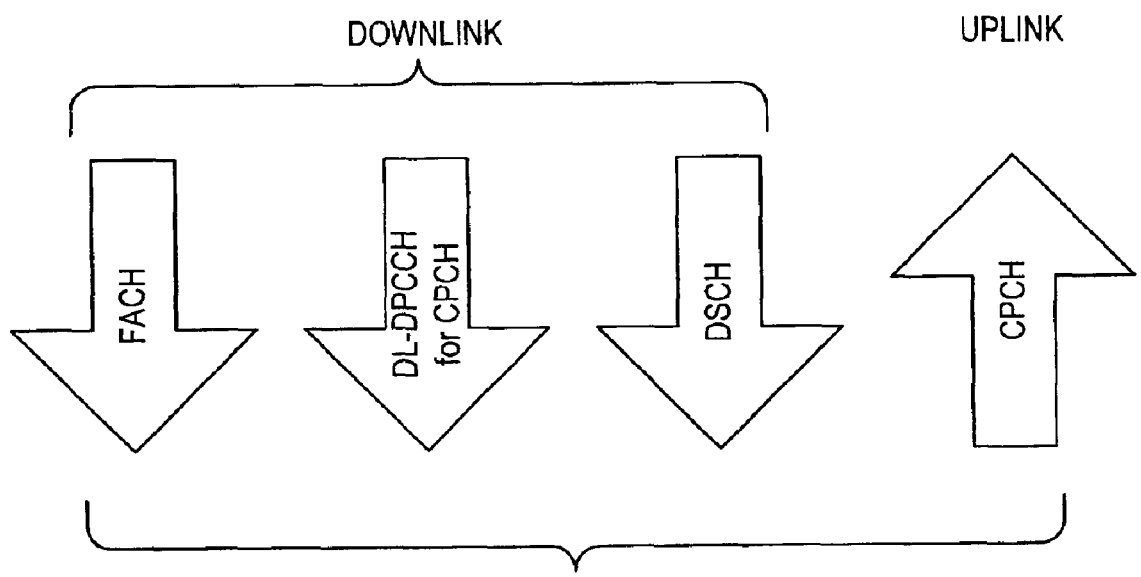
FIG. 4 is a diagrammatic representation illustrating the transport channels involved in the downlink packet switching, according to the present invention.

The present invention allows DSCH transmission without setting up the aDCHs by jointly using the CPCH and DSCH. This invention, still, does not make allocating aDCH obsolete for those UEs that have capabilites for that and which set-up bearers for traffic sources that benefit on alternate switching between DCH and DSCH transport. This invention provides means of using packet transport and fast switching even without the aDCH set-up. This invention may be advantageous for certain UE capability classes and for certain traffic bearer types. Actually, these two means can be used at the same time by different terminals communicating in the same cell using the DSCH; some terminals would use an aDCH+DSCH combination, other terminals would use a CPCH+DSCH combination. Thus, the CPCH is a counterpart of the DSCH. Diagrammatically, the transport channels involved in the connection procedure for downlink packet switching, according to the present invention, is shown in FIG. 4. As shown in FIG. 4, a DL-DPCCH for the CPCH is used to indicate the physical transport format (TFCI) of the DSCH and the physical control of the CPCH. The CPCH frame structure is represented in FIG. 9b. As it is known, a pCPCH has a data part that can carry small amounts of uplink information. This information can include short service request commands, download selection commands, transaction commands and all the acknowledgements, including RLC acknowledgements and network acknowledgements like TCP ACKs (transport control protocol acknowledgments). In the associated control part, the FBI field and TPC field can be used to provide fast feedback control and fast power control command for the DSCH channel. One beneficial embodiment of the invention is to save FACH common channel resources in the downlink. There will be traffic like SMS (short message service), location services and email downloading, which would significantly load the common channels RACH and FACH. Actually, they appear to be extremely limited resources and should be used mainly for initial access and paging purposes. This invention significantly reduces common channel load on RACH and FACH and enables services in CPCH and DSCH instead, still allowing the terminal (and the network entity) to remain in the cell_FACH state.

Figure 5:
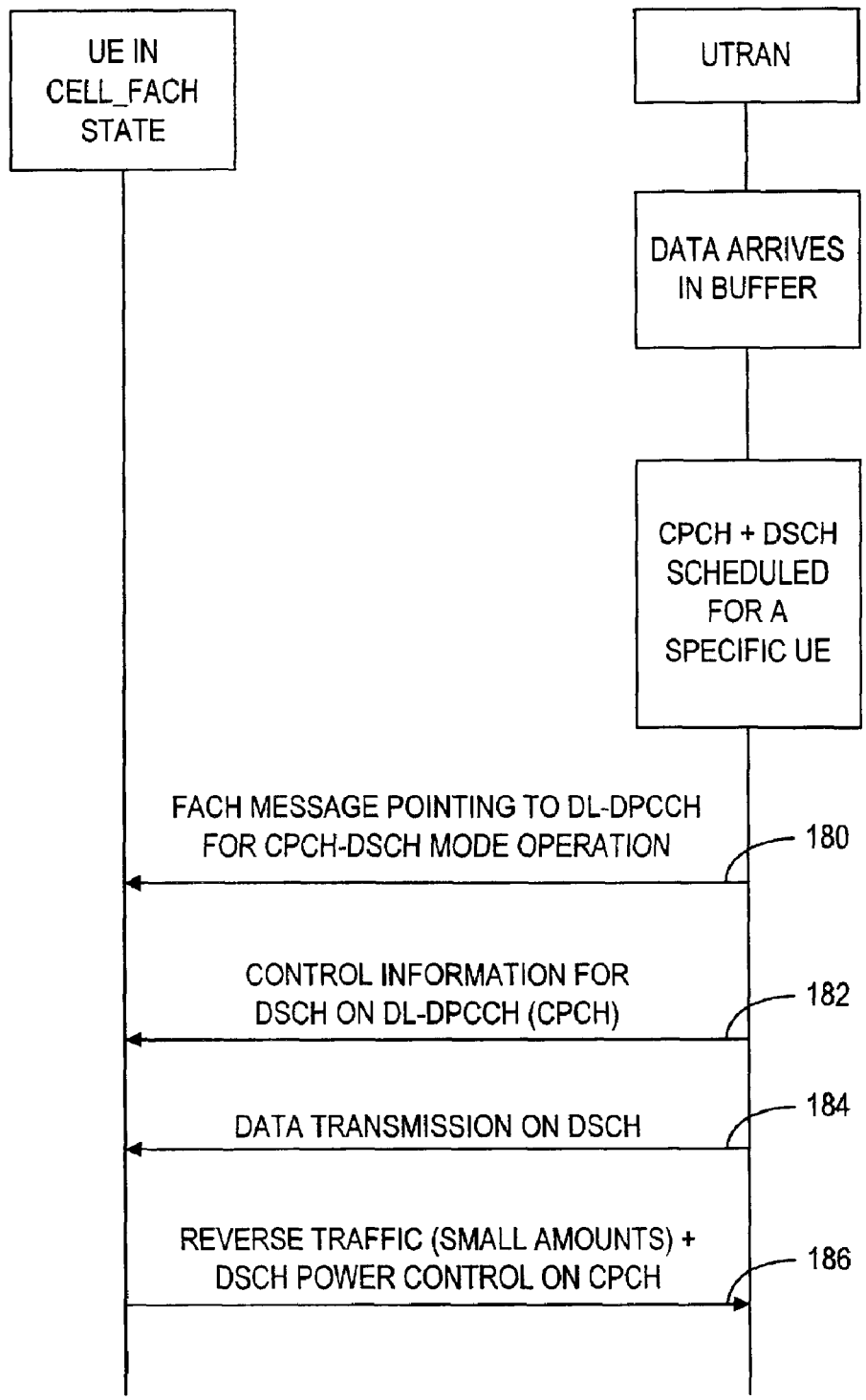
FIG. 5 is a diagrammatic representation illustrating the connection procedure for downlink packet switching, according to the present invention.
Figure 9A:
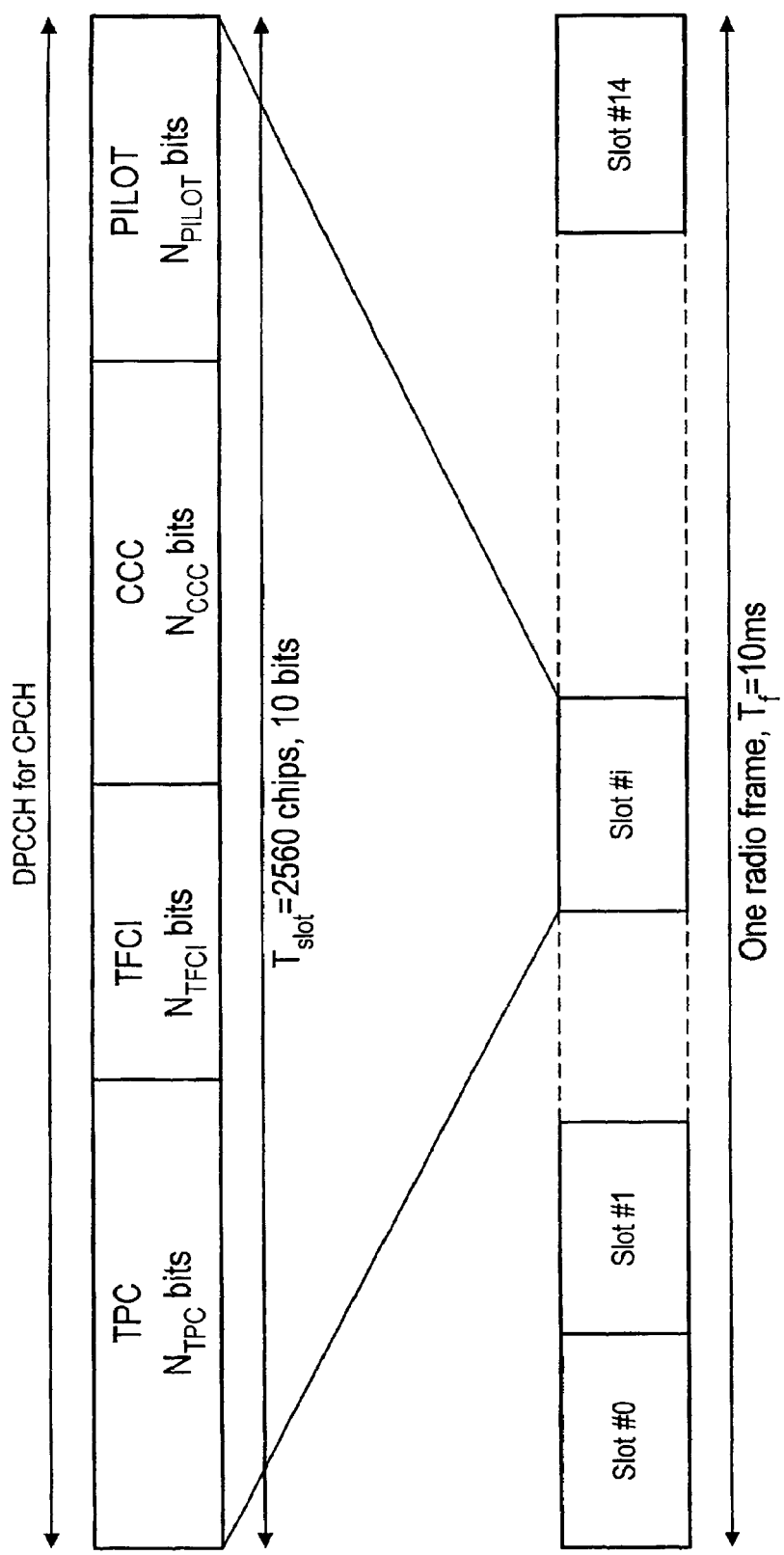
FIG. 9a illustrates the frame structure for DL-DPCCH for CPCH.
Figure 9B:
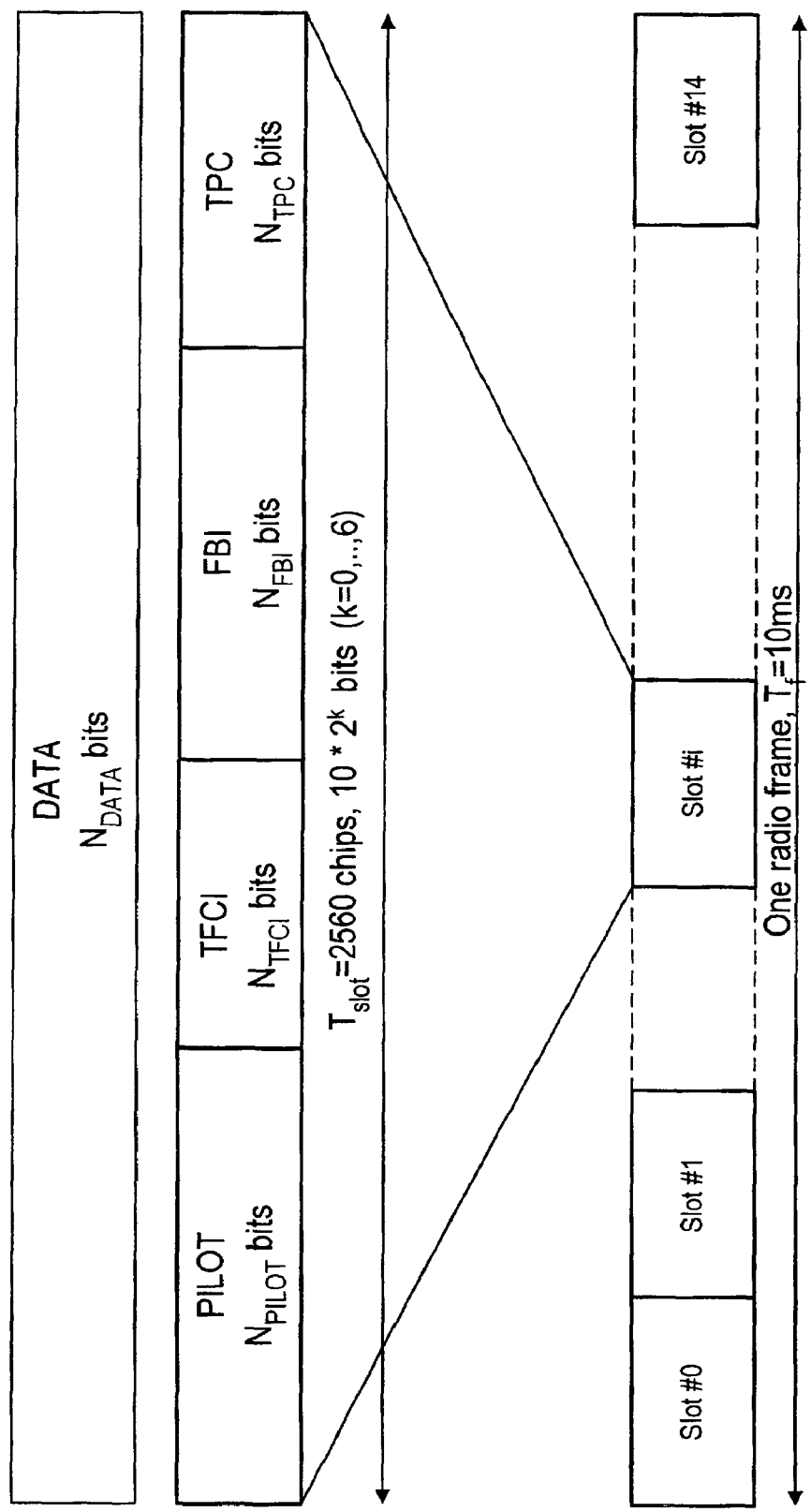
FIG. 9b illustrates the frame structure of the physical CPCH.

The frame structure for the DL-DPCCH for the CPCH is shown in FIG. 9a, and the DL-DPCCH fields for the CPCH message information are shown in Table I. As shown in FIG. 4, the FACH transport channel is used to carry the identity of the UE and indication for reading the DL-DPCCH for CPCH. This FACH message can be noted as a pointer message or scheduling indicator message. It is essential that this FACH signaling message has a high probability of correct reception, because the whole data amount transmitted on the DSCH would be lost if the FACH message is not received in time. Thus, it is preferable that the FACH transport channel transmits indication for the forthcoming allocation on the DSCH. Consequently, the UE reads the FACH message and acknowledges receipt of such message on the RACH before the allocation starts. If the scheduler does not receive an acknowledgment from the UE, it allocates the next period for another UE. In the cell_FACH state, the UE decodes the FACH message and, therefore, the setup delays associated with aDCH in the prior art method are eliminated. Preferably, the DSCH allocation message on the FACH transport channel is scheduled such that it is transmitted and acknowledged before the allocation starts on the DSCH. The connection procedure for downlink packet switching between the UE and UTRAN, according to the present invention, is shown in FIG. 5. As shown in FIG. 5, the UE maintains the cell_FACH state in the messaging period, without the need of switching to the cell_DCH state.

In prior art, the UE randomly selects one of the CPCH codes, advertised by the network, for transmission. Each access of CPCH codes will be subject to contention. In order to allocate one CPCH as the reverse uplink transport for the DSCH, it is preferred that one of the CPCH codes be taken out of the advertised list. Thus, one of the CPCH alternatives is reserved as a deterministic counterpart for the DSCH. Accordingly, when the UEs want to initiate a typical CPCH, they do not have this particular CPCH to select. Instead, this reserved CPCH will be allocated to one of the UEs by the DSCH during the DSCH scheduling period. This particular UE knows with certainty that it can access this counterpart CPCH without contention. Taking the counterpart CPCH into use, the UE follows the normal procedure with power ramp-up and preambles. The only omitted steps are the random selection of the CPCH and the contention phase with acquisition and collision/assignment indications. It should be understood that, there can be more CPCH codes reserved per DSCH, if DCSH enables code division structure inside. The invention defines that one physical CPCH (pCPCH) code counterpart is reserved per one physical DSCH (pDSCH) code channel.

The announcement of the CPCH-pDSCH counterparts can be carried out in many different ways. The announcement is carried out in one of the system information blocks (SIBs), as part of the System Information message sent on a BCCH (Broadcast channel) logical channel, which can be mapped onto the BCH or FACH transport channel. The SIBs containing static information are read only once per UE and the SIBs containing frequently changing parameters are read by the UE regularly on every repetition occasion. Accordingly, the tables in the SIB block are used to describe the relations between the CPCH and pDSCH for the entire (DSCH) code sub-tree. In general, the code notation can be in the form of $C_{CH, SF, k}$, where CH is the channel, SF is the spreading factor and k is the code index. If there is only one pDSCH in the sub-tree, we have:

$C_{DSCH, SFp, k}$; where SFp is the spreading factor of the DSCH parent node.

and $C_{CPCH, SFv, k}$; where SFv is the spreading factor of the CPCH code (free choice, but maximum bitrate and minimum SF may be limited)

If there are many pDSCHs under the same node with the same spreading factor, we have:

$C_{DSCH, SFp, [1 \ldots 2^i]}$; where i is the code-tree index and the $SF=2^i$, and $C_{CPCH, SFv, [1 \ldots 2^i]}$ If there are many pDSCHs under the same node with different spreading factors, we have:

$C_{DSCH, SFp, [L \ldots a]}$, where $a<2^i$; where $SFp=2^i$.

$C_{DSCH, 2*SFp, [2*a \ldots b]}$; where $b<2^{(i+1)}$ $C_{DSCH, 4*SFp, [(4*a+2*(b-2*a)) \ldots 2^{(i+2)}]}$, where L is the lowest code index for the entire DSCH sub-tree. If L=1, the whole code-tree is reserved for the DSCH and the pDSCHs will branch under the SF index i and $C_{CPCH, SFv, [1 \ldots ((a-L)+b-2*a)+(2^{(i+2)}-(4*a+2*(b-2*a))))]}$, where $2^i$ is the maximum number of codes with spreading factor i.

Preferably, the CPCH-pDSCH counterparts are announced for every terminal every time the bearer is set up in the bearer setup RRC-messages. If the bearer is defined to be such that it allows use of the CPCH-pDSCH method, it does not need the CPCH-pDSCH table of the sub-tree, but only the CPCH-pDSCH counterpart indication of that pDSCH, where this UE can be scheduled to. Of course, the UE can be changed to receive on a separate pDSCH, but this requires code handover signaling. The code handover signaling should thus also have the indication of the CPCH-pDSCH counterpart in the respective RRC-message.

The Information Element now has the code index for the pDSCH as:

$C_{DSCH, SFp, k}$

In the invention we have added another field to the Information Element for the CPCH counterpart: $C_{DSCH, SFp, n}$ and $C_{CPCH, SFv, m}$.

Figure 1:
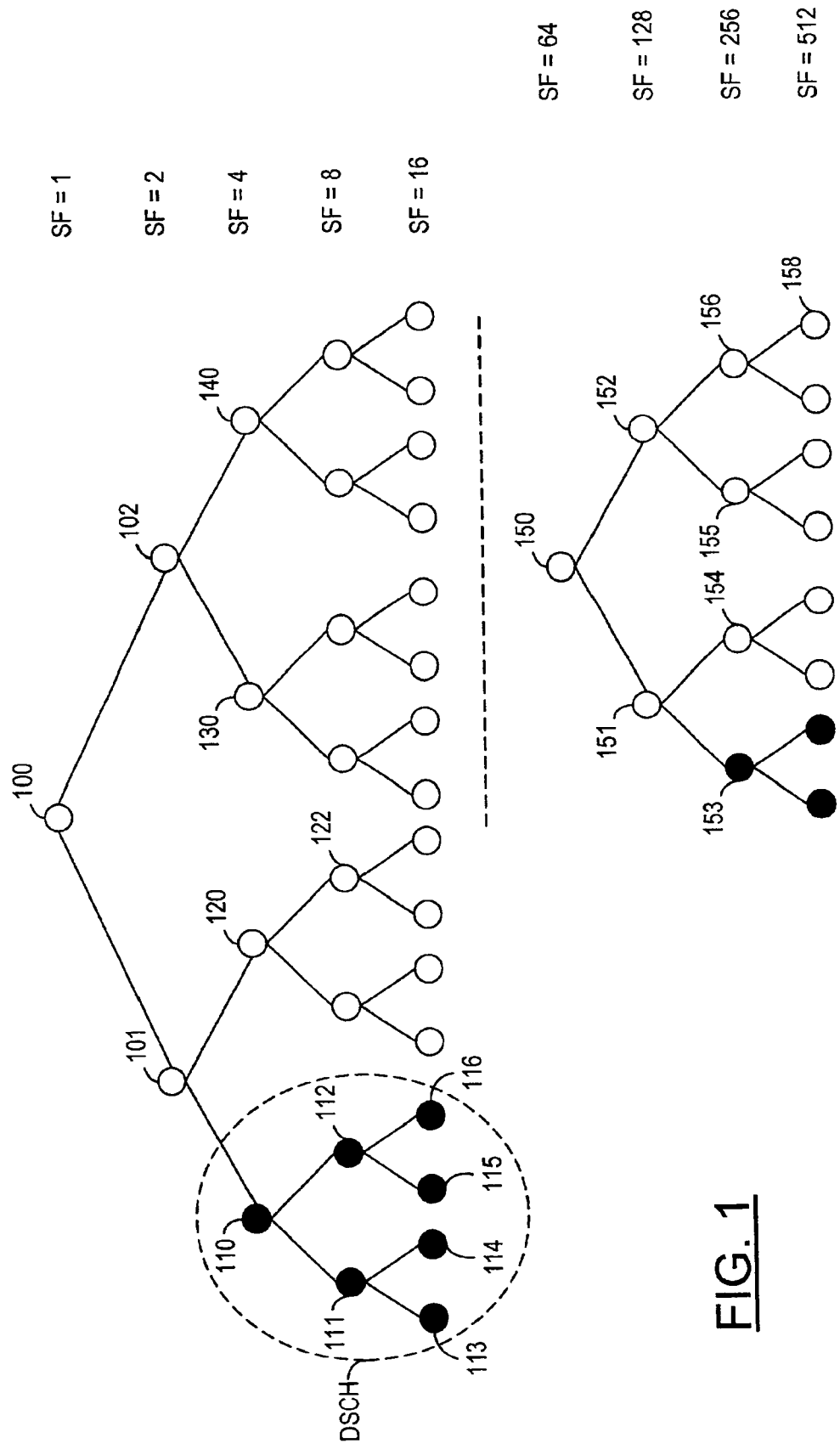
FIG. 1 is a diagrammatic representation illustrating a code tree, wherein channelization codes are used to reserve the DSCH and to allocate the aDCHs for different mobile terminals.
Figure 2:
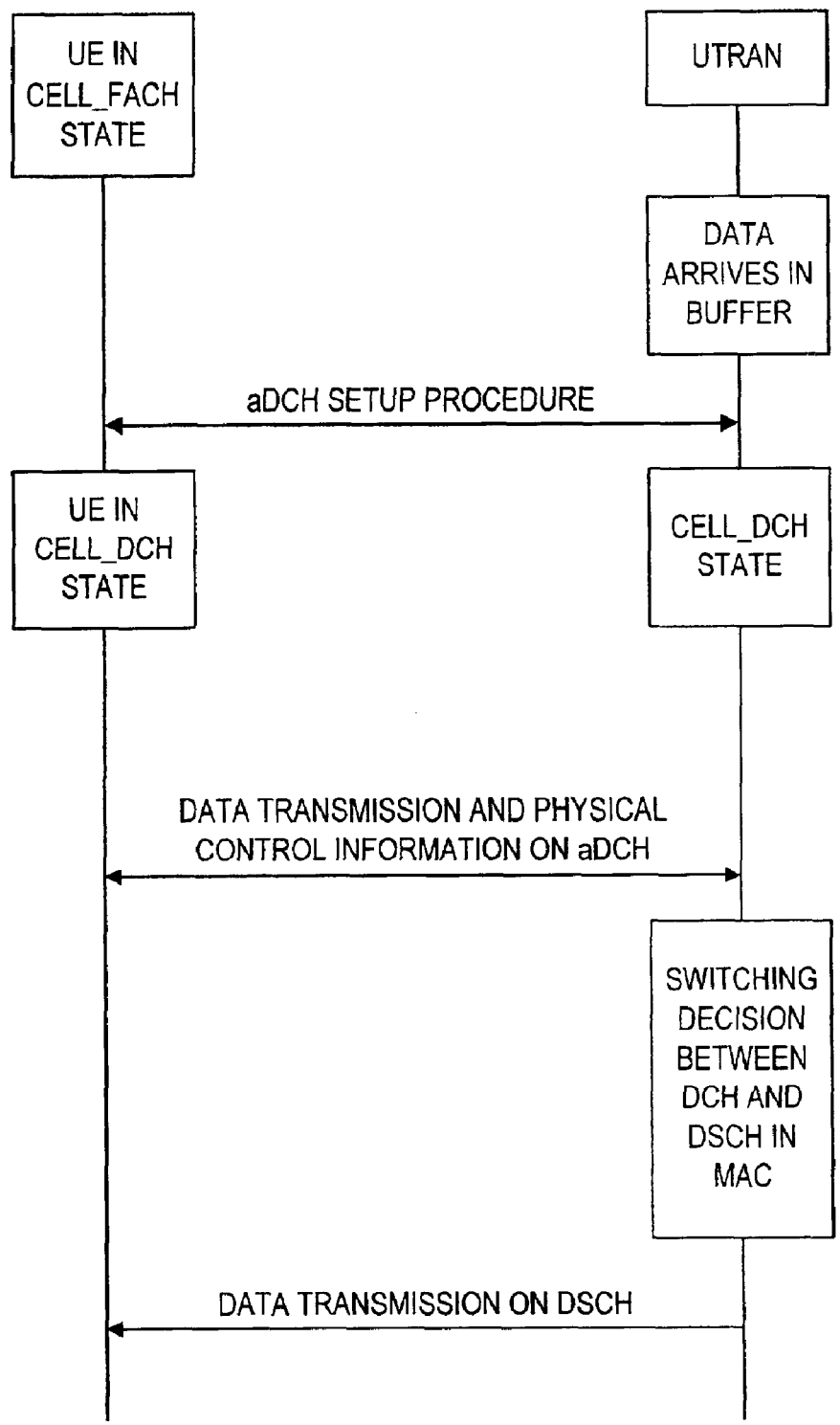
FIG. 2 is a diagrammatic representation illustrating the connection procedure for downlink packet switching, wherein an aDCH is used to serve as a reverse uplink transport of the DSCH.
Figure 3:
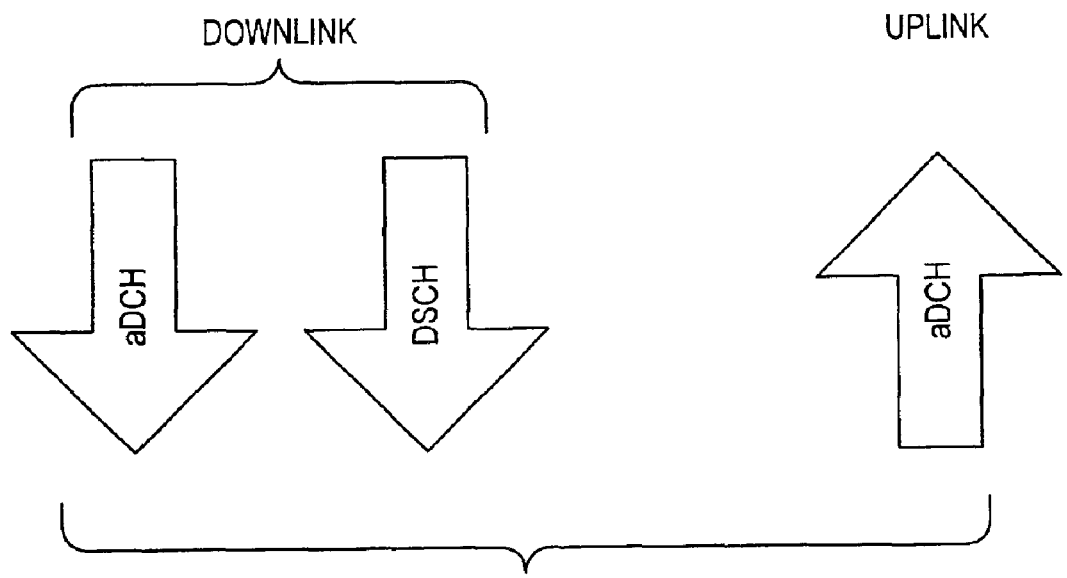
FIG. 3 is a diagrammatic representation illustrating the transport channels involved in the downlink packet switching, wherein an aDCH is used to serve as a reverse uplink transport of the DSCH.
Figure 6A:
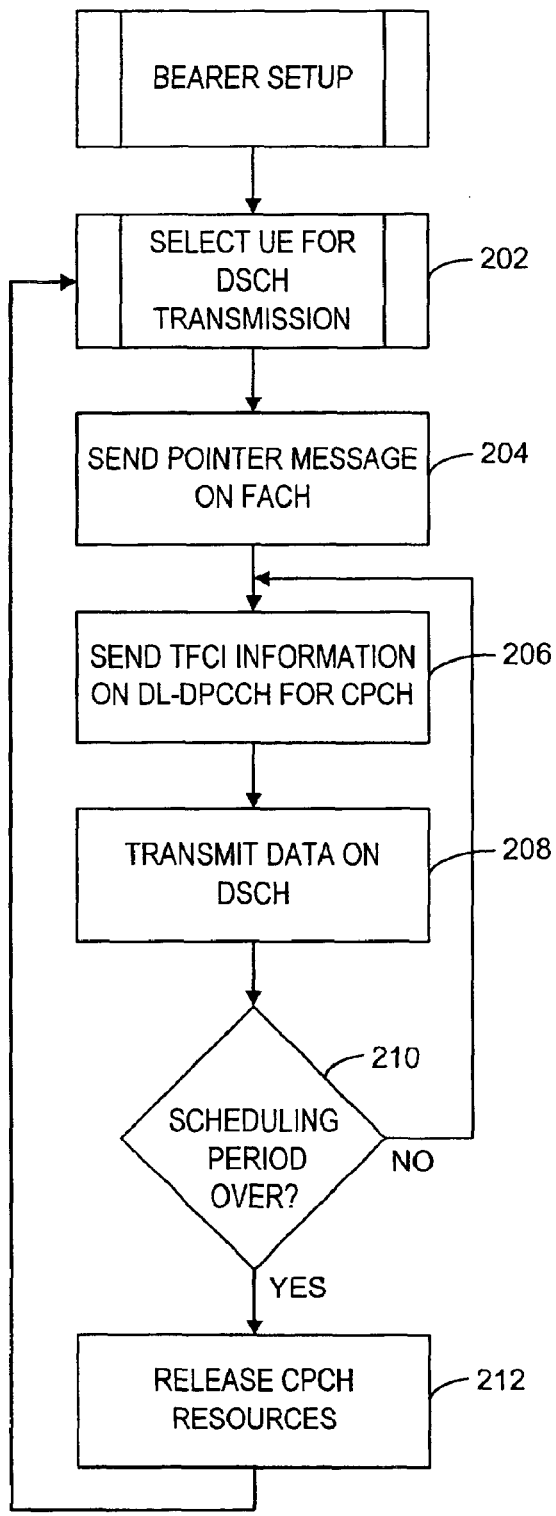
FIG. 6a is a flow chart illustrating the scheduling of CPCH+DSCH for an UE by the UTRAN.
Figure 6B:
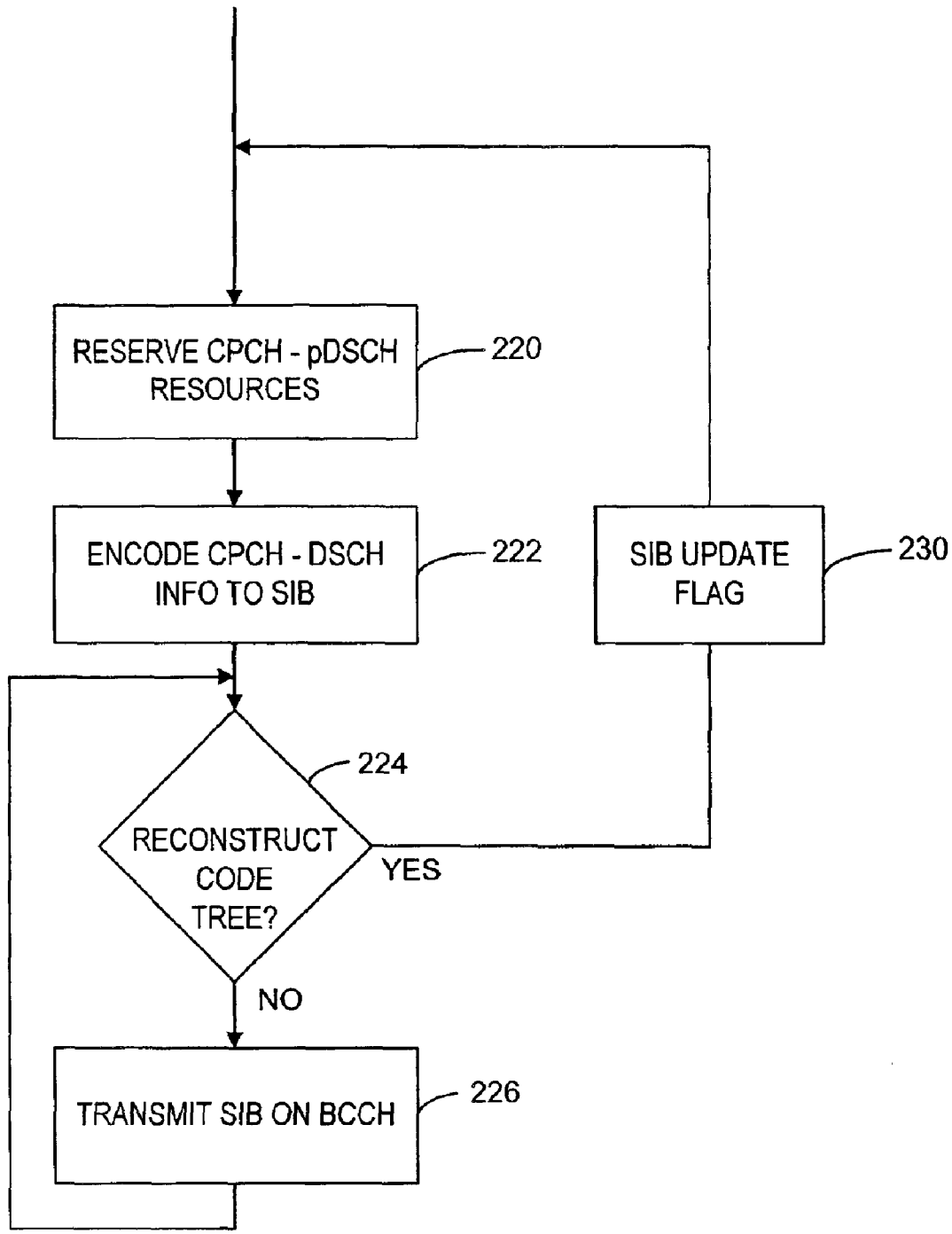
FIG. 6b is a flow chart illustrating the reservation of CPCH+DSCH by the UTRAN.
Figure 7:
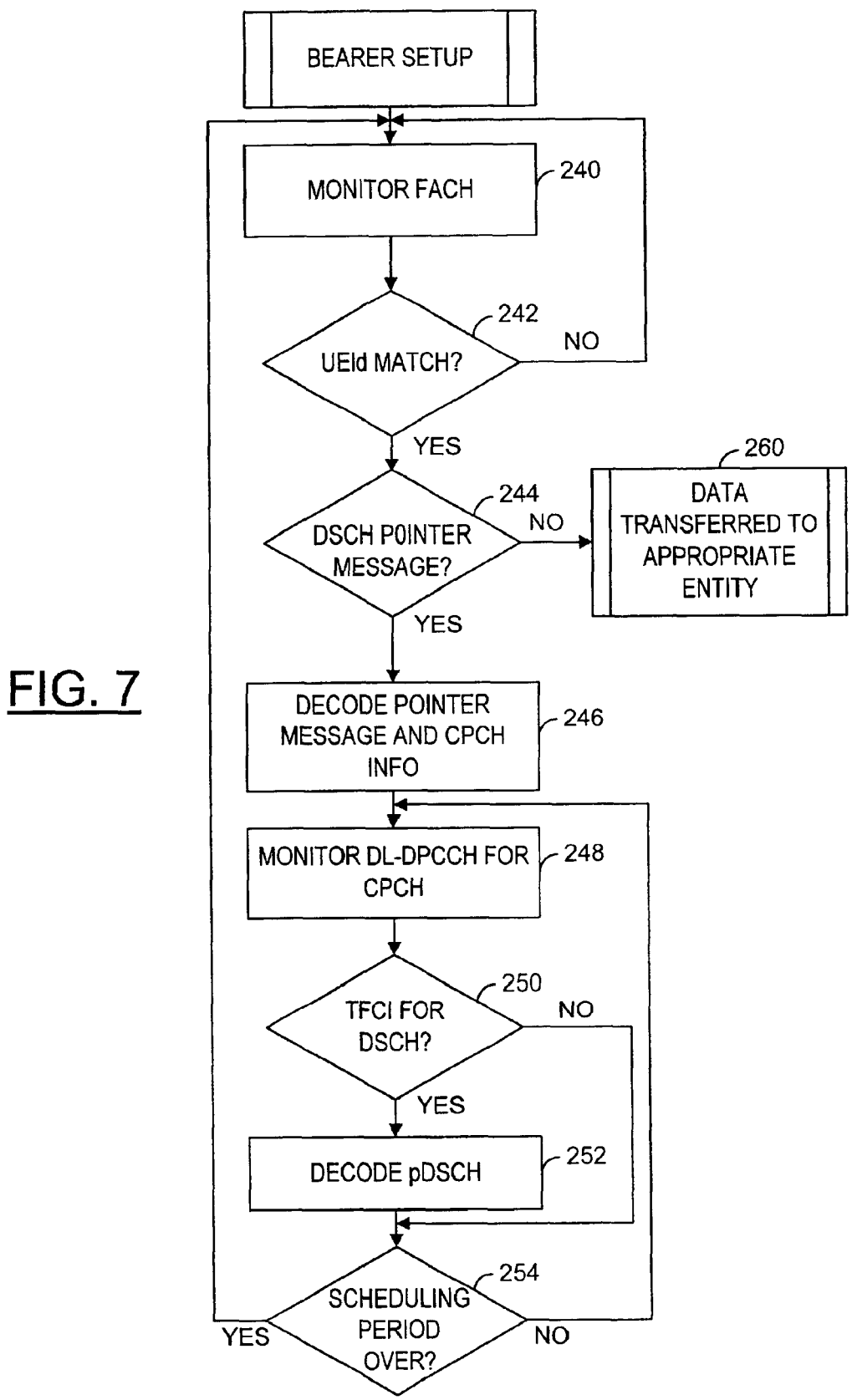
FIG. 7 is a flow chart illustrating the process in the UE following the FACH message pointing to DL-DPCCH for CPCH-DSCH mode operation.

The scheduling of CPCH as a pDSCH counterpart for a specific UE is illustrated in FIGS. 6 and 7. The UTRAN encodes CPCH-pDSCH pairing information to one of the SIB blocks. Preferably, the UTRAN encodes the CPCH-pDSCH pairing information in the Information Element (IE) represented in the RRC message for bearer setup. After the CPCH-pDSCH pairing is announced, the scheduling may start. Scheduling is a repetitive action that will continue infinitely, if reconfiguration does not occur. As shown in the flow chart in FIG. 6a, after the UTRAN selects an UE for DSCH for transmission at step 202. The UTRAN sends a pointer message on FACH to the UE at step 204 (see message 180 in FIG. 5). The UTRAN sends TFCI information on DL-DPCCH for CPCH (see TABLE I and the message 182 in FIG. 5) at step 206, and transmits data DSCH to the UE at step 208 (see message 184 in FIG. 5). The UTRAN checks to see whether the scheduling period is over at step 210. If so, it releases, at step 212, the CPCH-pDSCH resources. On the UE side, as it is in the cell_FACH state, the UE monitors the FACH for FACH message from the UTRAN at step 240 (see message 180 in FIG. 5), as shown in FIG. 7. If the identity of the selected UE does not match the identity of the UE receiving the FACH message, the message receiving UE ignores the current FACH message at step 242 and monitors the next. Otherwise the UE checks to see whether a DSCH pointer message is present at step 244. If there is no pointer message in the FACH message, then the UE has received another specified message type. In case this message is an aDCH setup message, it transfers the data to an appropriate network entity at step 260. Subsequently, the cell_FACH state of the UE is changed to the cell_DCH state, as depicted in FIG. 2. If there is a pointer message in the FACH message, the UE decodes the pointer message and CPCH information at step 246. Subsequently, the UE monitors the control information for DSCH on DL-DPCCH (CPCH) at step 248 (see message 182 in FIG. 5). The UE checks the content of the TFCI information for a DSCH allocation (see TABLE I and the message 182 in FIG. 5) at step 250. If one of the CPCH codes is reserved as a deterministic counterpart for the DSCH, then the UE decodes the pDSCH at step 252. At this point the LE sends reverse traffic and DSCH power control on CPCH to the UTRAN (see message 186 in FIG. 5) until the allocation of the CPCH for the UE is released (step 254).

The reservation of CPCH as a pDSCH counterpart may require permanent settings in the specific fields in the downlink AICH (Acquisition Indication Channel), CD-ICH (Collision Detection Indication Channel, and CA-ICH (Channel Assignment Indication Channel). Preferably, these three channels are not used for the counterpart CPCH. In this case, the CPCH need not do contention resolution and may only transmit the access preamble (a length of either 0 or 8 slots) before the data part.

It should be noted that the reservation of CPCP-pDSCH and the notification to the UEs of such reservation can be carried out in many different ways. One method is to encode the CPCH-pDSCH code tree structure to a SIB block. As it is known in the art, the SIB information is always present in the broadcast channel (BCCH, a logical channel) for the UEs to read. The network forms the SIBs and continuously transmits the SIBs in the BCCH channel. If the SIB contains static information, the UEs read it only once because the static SIB does not change its content. If the SIB contains semi-static information, the UEs are notified by the SIB change-flags. When the change is flagged, the UEs read the corresponding SIB. If such method is used, then the reserved CPCH-pDSCH resources can be conveyed to the UEs in accordance with the process, as illustrated in FIG. 6B. As shown in FIG. 6B, after the CPCH-pDSCH resources are reserved by the UTRAN at step 220, it encodes the CPCH-aDSCH information into an SIB for broadcasting at step 222. If the code tree is reconstructed to indicate the reserved CPCH-pDSCH, then the SIB change-flag is carried out at step 230 to notify the UEs of the reconstructed code tree, otherwise the same SIB is transmitted on the BCCH channel as static. However, the preferred embodiment of the present invention is to signal the CPCH-pDSCH information in an RRC message at a time of bearer setup and at a time of code handover.

Within one downlink DPCH, dedicated data generated at Layer 2 and above, i.e., the DCH, is transmitted in time-multiplex with control information generated at Layer 1 (known pilot bits, transmission power control (TPC) commands and an optional TFCI). Each downlink DPCH frame is split into 15 time slots, each with a length of 2560 chips, corresponding to one power-control period. Each of these slots has a different slot format. In particular, the slot format #0 is used for the downlink DPCCH for CPCH. The frame structure for the downlink DPCCH for CPCH is shown in FIG. 9a. The spreading factor for the DL-DPCCH is 512. DL-DPCCH for CPCH consists of known pilot bits, TFCI, TPC commands and CPCH Control Commands (CCC). CPCH control commands are used to support CPCH signalling. There are two types of CPCH control commands: Layer 1 control command as Start of Message Indicator, and higher layer control command such as Emergency Stop command. The exact number of bits of DL-DPCCH fields ($N_{pilot}$, $N_{TFCI}$, $N_{CCC}$ and $N_{TPC}$) is shown in TABLE I. As shown in TABLE I, the pilot bit pattern for $N_{pilot}=4$ is used for DL-DPCCH for CPCH. The present invention provides a new slot format, as shown as Slot Format #1 in TABLE I. In this new format, two TFCI fields can be present at the same time. The first part of the TFCI indicates the transport format on the DL-DPCCH itself, and the second part of the TFCI indicates the transmission on the DSCH. The second part of the TFCI indicates that the DSCH is allocated for the particular user with a defined spreading factor and transport format. However, as the Transport Format of the DL-DPCCH is fixed, it does not need any TFCI, and thus the whole TFCI field (defined to be non-zero) will be used for an indicator of the DSCH. As can be seen from TABLE I, the new slot format accommodates 2 TFCI bits per slot, which is enough to indicate the DSCH transport format, but allows only 2 pilot bits per slot. It should be noted that if only 2 pilot bits per slot are allocated, this may reduce the quality of channel estimation. It is possible, however, to carry out channel estimation from the common pilot channel alone. Alternatively, the common channel pilot can be used together with these 2 dedicated channel pilot bits for channel estimation, which is enough for a good channel estimation.

Figure 8:
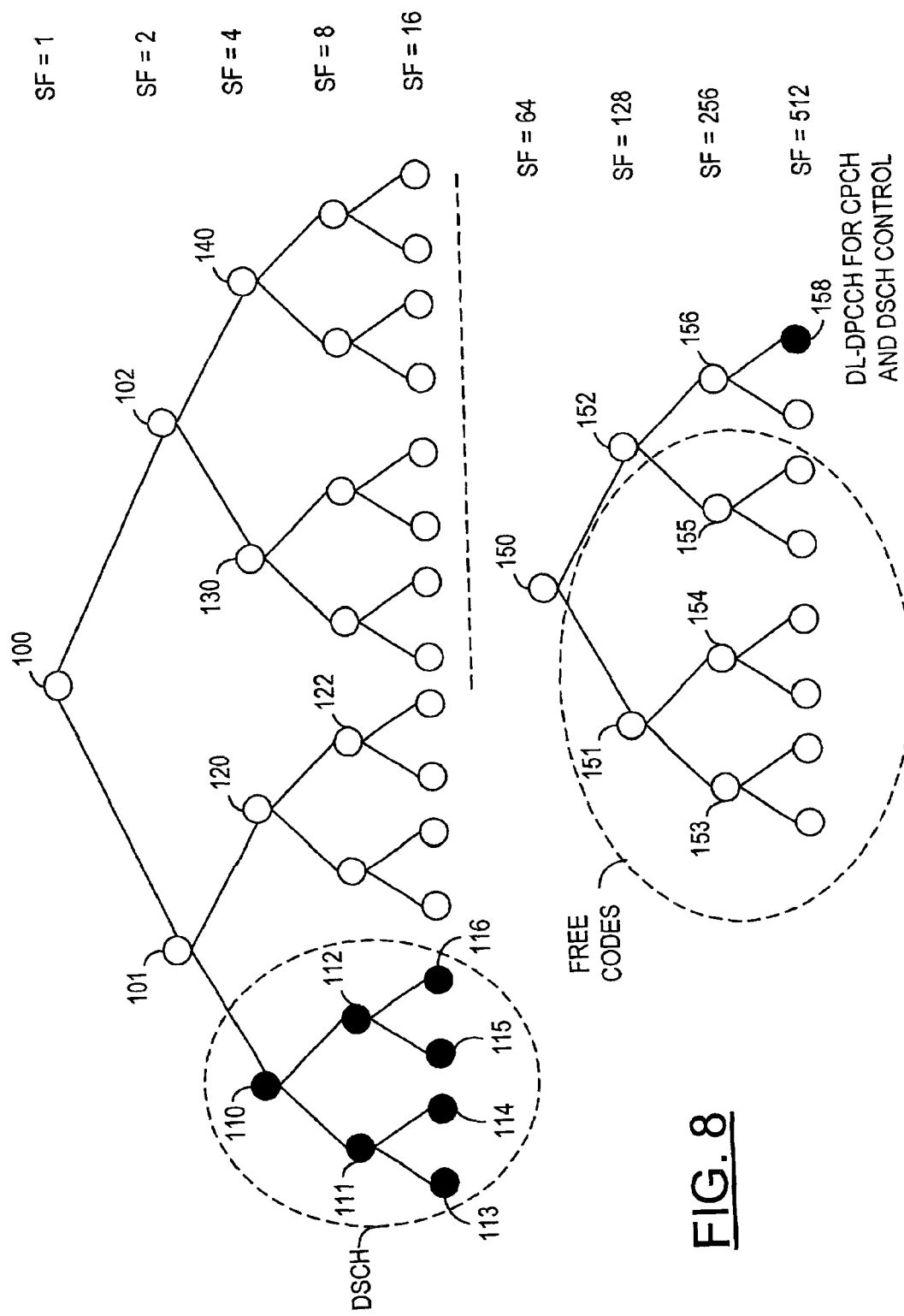
FIG. 8 is a diagrammatic representation illustrates the utilization of a code tree, according to the present invention.

The DL-DPCCH for CPCH and DSCH control can be specified in a node of a code tree, as shown in FIG. 8. For example, the node 158 at the SF=512 of the branch denoted by the node 150 can be used to specify the DL-DPCCH for CPCH and DSCH control. As such, the nodes 151, 153, 155 and the nodes therebelow are free codes for other services.

Figure 10:
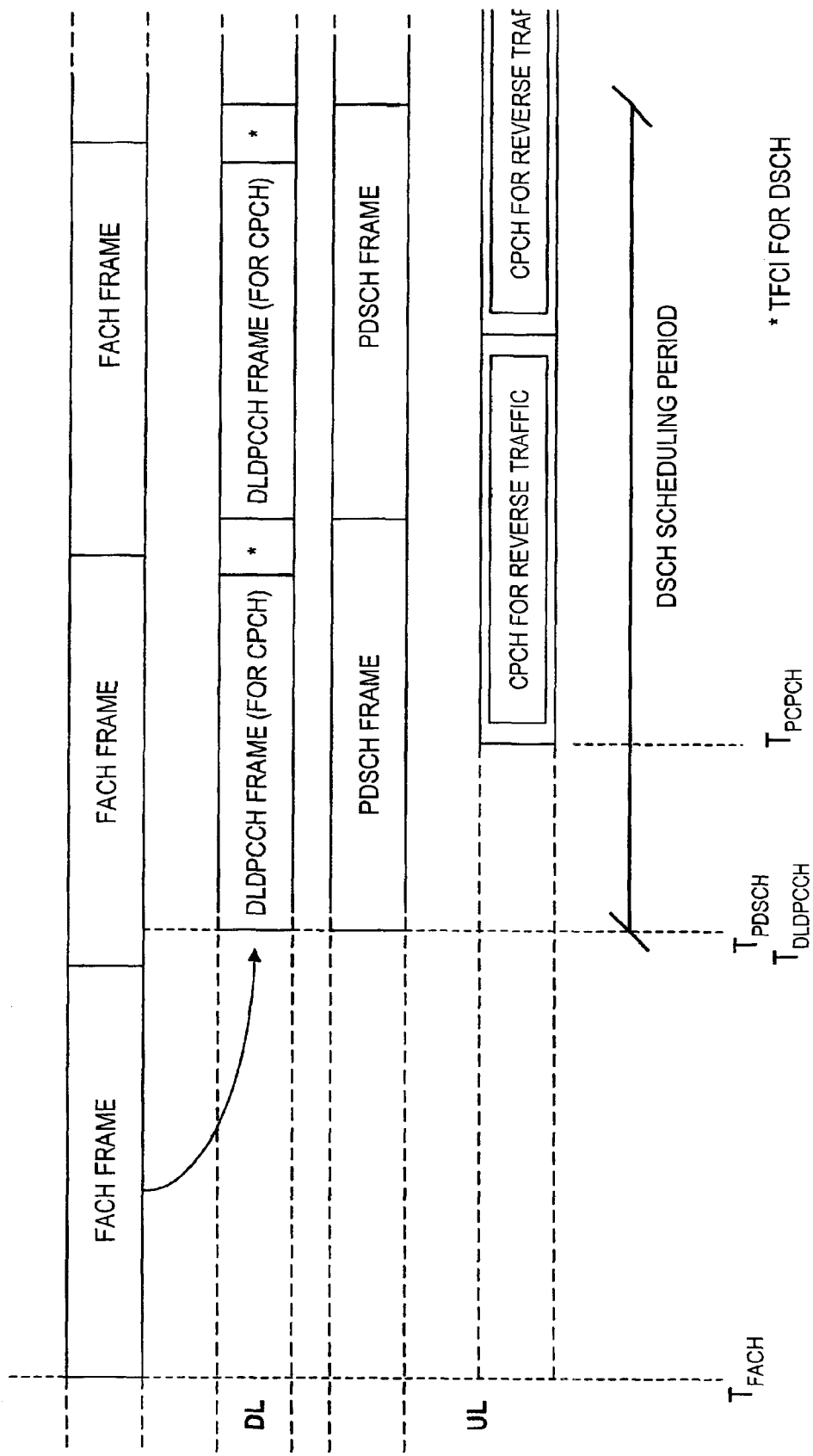
FIG. 10 illustrates a timing diagram showing the timing relation between FACH frame and pDSCH, pCPCH and DL-DPCCH frames, according to the present invention.

It should be noted that the CPCH is fast power-controlled, and the power control commands are signaled on the DL-DPCCH for CPCH. The DL-DPCCH for DSCH are synchronous so that for every DSCH frame, the UE can decode the TFCI indicator from the DL-DPCCH. The control bits on the DL-DPCCH can be used to force the UE to release the CPCH. The DSCH allocation periods and the DL-DPCCH for CPCH should be coordinated so that the CPCH is always released in the same frame (or in the frame number+1) time as the DSCH is released, i.e., when the DSCH allocation period is over. As such, there is no need for a separate CPCH release command. FIG. 10 illustrates the time relation between the channels both in scheduling periods and frame resolution.

The power control for DSCH by the CPCH can have several alternatives: fast power control, slow power control or no power control. The power control can be based on the received SIR measurements on the DSCH, on the BLER quality measures or on the acknowledgment statistics. The FBI and TFCI bits can be used for other types of control than power control. For example, they can be used for antenna transmit diversity parameter selection, adaptive modulation and coding scheme selection, and for tuning the hybrid ARQ (Automatic Request) re-transmission parameters. It is essential that the initial transmission power level for DSCH be estimated properly to avoid high power fluctuations in the whole cell caused by the DSCH.

TABLE I

DL-DPCCH fields for CPCH message transmission.

| Slot Format #i | Channel Bit Rate (kbps) | Channel Symbol Rate (ksps) | SF | Bits/Slot | DPCCH Bits/Slot | | | | Transmitted slots per radio frame $N_{Tr}$ |
|---|---|---|---|---|---|---|---|---|---|
| | | | | | $N_{TPC}$ | $N_{TFCI}$ | $N_{CCC}$ | $N_{Pilot}$ | |
| 0 | 15 | 7.5 | 512 | 10 | 2 | 0 | 4 | 4 | 15 |
| 1 | 15 | 7.5 | 512 | 10 | 2 | 2 | 4 | 2 | 15 |

The relative timing between a FACH frame and pDSCH frame is shown in FIG. 10. The start of a FACH frame is denoted by $T_{FACH}$, and the start of the associated pDSCH frame is denoted by $T_{PDSCH}$. The FACH messages will be transmitted and acknowledged during the previous scheduling period signaling the pointer or the scheduling message for the next scheduling period in the DSCH. As shown in FIG. 10, the DL-DPCCH frames are started substantially at the same time or with a given offset of 1 to k slots as the pDSCH frame. The pDSCH frame is associated to one FACH frame through the relation 46080 chips$\leq T_{PDSCH} - T_{FACH} < 84480$ chips. This means that the associated pDSCH frame starts anywhere between three slots after the end of the FACH frame, up to 18 slots behind the end of the FACH frame. The uplink CPCH frame has a fixed offset of x ms to the downlink channels. The method in the invention defines longer scheduling periods (1 frame or larger) and it is only relevant that the uplink CPCH and the downlink DSCH have coordinated scheduling periods in the frame number level. So, the uplink scheduling period starts and ends at the same frame number as the downlink scheduling period. However, the uplink scheduling period may be set to have an offset of one frame to the downlink frame number. This allows acknowledgements of the last DSCH frame of the scheduling period to be completed in the last frame of the CPCH.

In summary, the present invention makes a CPCH a deterministic counterpart of the DSCH to avoid the frequent switching between the cell_FACH state and the cell_DCH state in downlink packet switching. The present invention enables simple transmitter and receiver algorithms without macrodiversity as neither of the CPCH and DCSH use macrodiversity, but both are specific to a single cell. If the UE can read the cell-specific information and the FACH of a cell in the downlink, and the UE can receive the DSCH from that particular cell, the RACH and the CPCH transmission by the UE should be received by the same base station.

For many traffic profiles, it is favorable to change to the cell_DCH state, but there exist other traffic profiles where remaining in the cell_FACH state is preferable. The DCH can benefit the macrodiversity gain, and it is more efficient from the cell radio resource management point of view than the CPCH. It is obvious that for many traffic profiles, the usage of DCH alone, or DCH together with the DSCH, is the best possible choice. However, for bursty traffic profiles, it is preferable to use CPCH and DSCH jointly. Furthermore, it may not be necessary to carry out many parallel CPCH transmissions at a time, because a single CPCH can be time-division shared between different bearers of different UEs in a similar manner as the DSCH. Thus, it seems reasonable to use CPCH as a counterpart for the DSCH.

The present invention is applicable to short message services (SMSs), location services, email downloading, web-like applications and TCP sessions, as mentioned hereinabove. Still, one additional candidate would be a VoIP application. The delay of aDCH setup can be crucial if VoIP should be transmitted on the DSCH. The DSCH could be divided to SF 64 (or to SF 128) pDSCHs, which could be very effectively used for VoIP traffic with high statistical multiplexing gain. Either the voice quality would suffer significantly or the aDCH should be kept reserved for long periods of time even without voice activity. The new CPCH-DSCH method allows DSCH to be used for VoIP even without aDCHs, as switching to DSCH can be made fast enough. Still, for the conversational VoIP traffic, it seems most suitable to set up the DCH channels.

Moreover, it is understood that the base station as described herein includes Node B, RNC and related elements in UTRAN, or Base Tranceiver Station and Base Station Controller in a General Packet Radio Service network.

Thus, although the invention has been described with respect to a preferred embodiment thereof, it will be understood by those skilled in the art that the foregoing and various other changes, omissions and deviations in the form and detail thereof may be made without departing from the spirit and scope of this invention.

What is claimed is:

1. A method of improving downlink packet switching for use in a mobile telecommunications network having a plurality of base stations capable of communicating in corresponding uplink and downlink with a plurality of mobile terminals operating a frequency division duplex (FDD) mode, wherein a downlink shared channel (DSCH) is used to carry user data to the mobile terminals, and wherein the mobile terminals are capable of operating in a forward access channel (cell_FACH) state and a dedicated channel (cell_DCH) state and wherein the mobile terminals are also capable of state-switching between the cell_FACH state and the cell_DCH state for setting up an associated dedicated channel (aDCH) for carrying physical control information between the mobile terminals and the base stations in DSCH scheduling for downlink packet switching, said method comprising the steps of:

selecting, by a communicating base station, a mobile terminal among said plurality of mobile terminals for transmission of a defined down link shared channel (DSCH); and providing a message in a forward access channel (FACH) to the selected mobile mobile indicative of an operation mode using a further transportation channel different from the aDCH for carrying the physical control information between the selected mobile terminal and said communicating base station for avoiding the state-switching during the downlink packet switching, wherein the further transportation channel comprises a common uplink packet channel specified for said operation mode.

2. The method of claim 1, wherein the specified common packet channel (CPCH) is used as a reverse link transport of the defined physical downlink shared channel (DSCH).

3. The method of claim 2, wherein the specified common packet channel (CPCH) is scheduled as a reverse link transport of the specified DSCH in a scheduling period in the uplink, wherein said scheduling period is equal to a scheduling period for the DSCH in the downlink with a fixed frame offset.

4. The method of claim 1, wherein the message indicative of said operation mode comprises a physical transport format (TFCI) of the DSCH and the message is carried in a downlink dedicated physical control channel (DPCCH) for the specified common packet channel (CPCH).

5. The method of claim 4, wherein the downlink dedicated physical control channel for the specified common packet channel (DL-DPCCH) is announced to the mobile terminals for announcing the common packet channel (CPCH) to the mobile terminals.

6. The method of claim 5, wherein the message in the forward access channel (FACH) indicative of said operation mode is provided when a traffic load associated with the cell_FACH state is in a temporal peak-load condition for reducing said traffic load.

7. The method of claim 6, wherein said traffic load is reduced by switching protocol data units from the FACH to the defined DSCH.

8. The method of claim 5, wherein the message in the forward access channel (FACH) indicative of said operation mode is provided when a traffic load associated with the cell_FACH state is smaller than a predetermined value and said traffic load is directed to the defined DSCH.

9. The method of claim 4, further comprising the step of defining coordination of frame time reference, allocation and scheduling of the specified packet channels CPCH, DL-DPCCH and DSCH.

10. The method of claim 4, wherein the downlink dedicated physical control channel (DPCCH) for the common packet channel (CPCH) which is used as the reverse link transport of the DSCH is provided as a code in a node of a downlink code-tree.

11. The method of claim 10, further comprising the step of decoding the code in the downlink code tree by the selected mobile terminal.

12. The method of claim 10, wherein the code is an orthogonal code for preventing the CPCH code reserved for pDSCH uplink traffic of the selected mobile terminal being acquired by a further mobile terminal different from the selected mobile terminal.

13. The method of claim 1, wherein the specified common packet channel (CPCH) in the uplink is announced to the mobile terminals in a system information block (SIB).

14. The method of claim 13, wherein the uplink common packet channel (CPCH) is announced to the mobile terminals as an information element presented in the radio resource control (RRC) message.

15. The method of claim 1, wherein said message comprises a scheduling message provided to the selected mobile terminal when the selected mobile terminal is in the cell_FACH state.

16. The method of claim 1, wherein the selected mobile terminal is identified in the FACH message.

17. A mobile telecommunications network having a plurality of base stations capable of communicating in corresponding uplink and downlink with a plurality of mobile terminals operating a frequency division duplex (FDD) mode, wherein a downlink shared channel (DSCH) is used to carry user data to the mobile terminals, and wherein the mobile terminals are capable of operating in a forward access channel (cell_FACH) state and a dedicated channel (cell_DCH) state and wherein the mobile terminals are also capable of state-switching between the cell_FACH state and the cell_DCH state for setting up an associated dedicated channel (aDCH) for carrying physical control information between the mobile terminals and the base stations in DSCH scheduling for downlink packet switching, said network comprising:

means, located in a communicating base station, for selecting a mobile terminal among said plurality of mobile terminals for transmission of a defined down link shared channel (DSCH); and means for providing message in a forward access channel (FACH) to the selected mobile terminal indicative of an operation mode using a further transportation channel different from the aDCH for carrying the physical control information between the selected mobile terminal and said communicating base station for avoiding the state-switching during the downlink packet switching, wherein the further transportation channel comprises a common uplink packet channel specified for said operation mode.

18. The network of claim 17, wherein the specified common packet channel (CPCH) is used as a reverse link transport of the defined physical downlink shared channel (DSCH).

19. The network of claim 17, wherein the message indicative of said operation mode comprises a physical transport format (TFCI) of the DSCH and the message is carried in a downlink dedicated physical control channel (DPCCH) for the specified common packet channel (CPCH).

20. The network of claim 19, wherein the downlink dedicated physical control channel for the specified common packet channel (DL-DPCCH) is announced to the mobile terminals for announcing the common packet channel (CPCH) to the mobile terminals.

21. The network of claim 20, wherein the message in the forward access channel (FACH) indicative of said operation mode is provided when a traffic load associated with the cell_FACH state is in a temporal peak-load condition for reducing said traffic load.

22. The network of claim 21, wherein said traffic load is reduced by switching protocol data units from the FACH to the defined DSCH.

23. The network of claim 20, wherein the message in the forward access channel (FACH) indicative of said operation mode is provided when a traffic load associated with the cell_FACH state is smaller than a predetermined value and said traffic load is directed to the defined DSCH.

24. The network of claim 19, wherein the downlink dedicated physical control channel (DPCCH) for the common packet channel (CPCH) which is used as the reverse link transport of the DSCH is provided as a code in a node of a downlink code-tree.

25. The network of claim 24, further comprising means, located in the selected mobile terminal, for decoding the code in the downlink code tree.

26. The network of claim 24, wherein the code is an orthogonal code for preventing the CPCH code reserved for pDSCH uplink traffic of the selected mobile terminal being acquired by a further mobile terminal different from the selected mobile terminal.

27. The network of claim 19, wherein the specified common packet channel (CPCH) is scheduled as a reverse link transport of the specified DSCH in a scheduling period in the uplink, wherein said scheduling period is equal to a scheduling period for the DSCH in the downlink with a fixed frame offset.

28. The network of claim 19, further comprising means of defining coordination of frame time reference, allocation and scheduling of the specified packet channels CPCH, DL-DPCCH and DSCH.

29. The network of claim 17, wherein the specified common packet channel (CPCH) in the uplink is announced to the mobile terminals in a system information block (SIB).

30. The network of claim 29, wherein the uplink common packet channel (CPCH) is announced to the mobile terminals as an information element presented in the radio resource control (RRC) message.

31. The network of claim 17, wherein said message comprises a scheduling message provided to the selected mobile terminal when the selected mobile terminal is in the cell_FACH state.

32. The network of claim 17, wherein the selected mobile terminal is identified in the FACH message.

33. A mobile apparatus for use in a mobile telecommunications network having a plurality of base stations capable of communicating in corresponding uplink and downlink with said mobile apparatus and a plurality of further mobile apparatus operating a frequency division duplex (FDD) mode, wherein a downlink shared channel (DSCH) is used to carry user data to said mobile apparatus, and wherein said mobile apparatus is capable of operating in a forward access channel (cell_FACH) state and a dedicated channel (cell_DCH) state, and said mobile apparatus is also capable of state-switching between the cell_FACH state and the cell_DCH state for setting up an associated dedicated channel (aDCH) for carrying physical control information between said mobile apparatus and the base stations in DSCH scheduling for downlink packet switching, said mobile apparatus comprising means for receiving a message conveyed in a forward access channel (FACH) indicative of an operation mode using a further transportation channel different from the aDCH for carrying the physical control information between the said mobile apparatus and a communicating base station for avoiding the state-switching during the downlink packet switching, when said mobile apparatus is selected by the communicating base station for transmission of a defined down link shared channel (DSCH);

wherein the further transportation channel comprises a common uplink packet channel specified for said operation mode.

34. The mobile apparatus of claim 33, wherein the further transportation channel comprises a common packet channel (CPCH) specified for said operation mode for use as a reverse link transport of the defined physical downlink shared channel (DSCH), wherein the specified CPCH is announced in a system information block (SIB) as an information element presented in the radio resource control (RRC) message.

35. The mobile apparatus of claim 34, wherein the message indicative of said operation mode comprises a physical transport format (TFCI) of the DSCH and the message is carried in a downlink dedicated physical control channel (DPCCH) for the specified common packet channel (CPCH).

36. The mobile apparatus claim 35, wherein the downlink dedicated physical control channel for the specified common packet channel (DL-DPCCH) is indicative of the specified common packet channel (CPCH), and wherein said DL-DPCCH is provided to said mobile apparatus as a code in a node of a downlink code-tree, said mobile apparatus further comprising means for decoding the code for identifying the specified CPCH.

37. The mobile apparatus of claim 36, wherein the code is an orthogonal code for preventing the CPCH code reserved for pDSCH uplink traffic of the selected mobile terminal being acquired by one of the further mobile apparatus.

38. The mobile apparatus of claim 33, wherein said message comprises a scheduling message provided to the selected mobile terminal when said mobile apparatus is in the cell_FACH state.

39. A network apparatus to be used in a mobile telecommunications network having a plurality of base stations capable of communicating in corresponding uplink and downlink with a plurality of mobile terminals operating a frequency division duplex (FDD) mode, wherein a downlink shared channel (DSCH) is used to carry user data to the mobile terminals, and wherein the mobile terminals are capable of operating in a forward access channel (cell__FACH) state and a dedicated channel (cell__DCH) state and wherein the mobile terminals are also capable of state-switching between the cell__FACH state and the cell__DCH state for setting up an associated dedicated channel (aDCH) for carrying physical control information between the mobile terminals and the base stations in DSCH scheduling for downlink packet switching, said network apparatus comprising:

means for selecting a mobile terminal among said plurality of mobile terminals for transmission of a defined down link shared channel (DSCH); and means for providing a message in a forward access channel (FACH) to the selected mobile terminal indicative of an operation mode using a specified common packet channel (CPCH) for carrying the physical control information between the selected mobile terminal and a communicating base station for avoiding the state-switching during the downlink packet switching.

40. The network apparatus of claim 39, wherein the specified common packet channel (CPCH) is used as a reverse link transport of the defined physical downlink shared channel (DSCH).

41. The network apparatus of claim 39, wherein the specified common packet channel (CPCH) in the uplink is announced to the mobile terminals in a system information block (SIB) as an information element present in the radio resource control (RRC) message.

42. The network apparatus of claim 39, wherein the message indicative of said operation mode comprises a physical transport format (TFCI) of the DSCH and the message is carried in a downlink dedicated physical control channel (DL-DPCCH) for the specified common packet channel (CPCH).

43. The network apparatus of claim 42, wherein the DL-DPCCH for the specified CPCH is announced to the mobile terminals for announcing the specified CPCH to the mobile terminals.

44. The network apparatus of claim 42, wherein the DL-DPCCH for the specified is provided as a code in a node of a downlink code-tree.

45. The network apparatus of claim 44, wherein the code is an orthogonal code for preventing the CPCH code reserved for pDSCH uplink traffic of the selected mobile terminal being acquired by a further mobile terminal different from the selected mobile terminal.

46. The network apparatus of claim 42, wherein the specified common packet channel (CPCH) is scheduled as a reverse link transport of the specified DSCH in a scheduling period in the uplink, wherein said scheduling period is equal to a scheduling period for the DSCH in the downlink with a fixed frame offset.

47. The network apparatus of claim 42, further comprising means of defining coordination of frame time reference, allocation and scheduling of the specified packet channels CPCH, DL-DPCCH and DSCH.

48. The network apparatus of claim 39, wherein said message comprises a scheduling message provided to the selected mobile terminal when the selected mobile terminal is in the cell__FACH state.

49. The network apparatus of claim 48, further comprising means for monitoring traffic for providing the message in the forward access channel (FACH) indicative of said operation mode when a traffic load associated with the cell__FACH is in a temporal peak-load condition for reducing said traffic load.

50. The network apparatus of claim 49, wherein said traffic load is reduced by switching protocol data units from the FACH to the defined DSCH.

51. The network apparatus of claim 48, further comprising means for monitoring traffic for providing the message in the forward access channel (FACH) indicative of said operation mode when a traffic load associated with the cell__FACH state is smaller than a predetermined value.

52. The network apparatus of claim 39, wherein the selected mobile terminal is identified in the FACH message.

* * * * *

UNITED STATES PATENT AND TRADEMARK OFFICE
CERTIFICATE OF CORRECTION

PATENT NO. : 6,970,438 B2 Page 1 of 1
DATED : November 29, 2005
INVENTOR(S) : Amit Mate et al.

It is certified that error appears in the above-identified patent and that said Letters Patent is hereby corrected as shown below:

Column 13,
Line 50, second occurrence of "mobile" should be -- terminal --.

Column 15,
Line 5, after "providing" insert -- a --.
Line 22, "(TECI)" should be -- (TFCI) --.

Column 16,
Line 8, after "cell" insert -- _ --.
Line 51, after "apparatus" insert -- of --.

Signed and Sealed this

Fourth Day of April, 2006

JON W. DUDAS
*Director of the United States Patent and Trademark Office*